United States Patent Office 3,376,258
Patented Apr. 2, 1968

3,376,258
POLYESTERS AND POLYAMIDES OF IMPROVED STABILITY
Hermann Gysling, Riehen, and Hans Jakob Peterli, Basel-Land, Switzerland, assignors to J. R. Geigy A.G., Basel, Switzerland
No Drawing. Filed Dec. 5, 1963, Ser. No. 328,198
Claims priority, application Switzerland, Dec. 11, 1962, 14,489/62, 14,490/62
9 Claims. (Cl. 260—47)

ABSTRACT OF THE DISCLOSURE

Various aspects of the invention are disclosed. The first aspect provides new fiber-forming polyesters as well as process for their preparation. The polyesters are obtained by reacting (a)         HO—A—OH
(b)     ROOC—B—COOR′, and
(c)

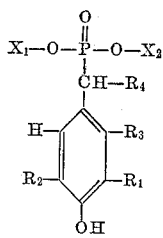

In the second aspect, fiber-foaming polyamides are provided as well as process for their preparation. The polyamides are obtained by reacting (a)         H₂N—A—NH₂
(b)     HOOC—B—COOH, and
(c)

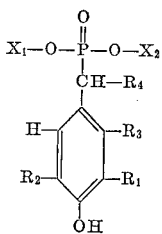

In a further aspect of the invention, the fiber-forming polyamide is provided which is the reaction product of

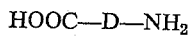
HOOC—D—NH₂ or a lactam or polymer thereof with a phosphonic acid ester of the formula

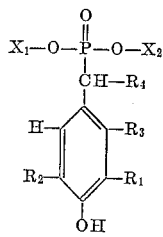

---

Specification

PART I

According to a first aspect, the present invention concerns new polyesters of improved stability and particularly oxidation-resistant, color-stable, linear, fiber-forming polyesters as well as processes for the production thereof.

These new polyesters are obtained by reacting, at raised temperatures, compounds of the formula

$$HO—A—OH \quad\quad (I)$$

wherein A represents the organic radical of a divalent alcohol, with dicarboxylic acids of the benzene series which do not form cyclic anhydrides or with their esters, of the formula

$$ROOC—B—COOR' \quad\quad (II)$$

wherein B represents the radical of the dicarboxylic acid and R and R′ independently of each other represent hydrogen, a lower alkyl radical, an ω-hydroxyalkyl radical or a radical of the formula

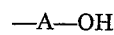
—A—OH and with phosphonic acid esters of the formula

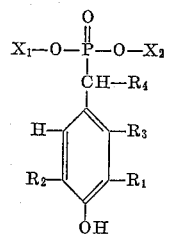

(III)

wherein X₁ and X₂ independently of each other represent an alkyl group having 1 to 10 carbon atoms, a ω-hydroxyalkyl group of the formula A—OH, a halogenalkyl group of the formula A—Cl, or cyclohexyl group, R₁ and R₂ independently of each other represent hydrogen, an alkyl, cyclohexyl or 1-methylcyclohexyl—(1) group, whereof at least one of R₁ and R₂ is a secondary or tertiary alkyl or cycloalkyl group, R₃ represents hydrogen or the methyl group, and R₄ represents hydrogen, the methyl, ethyl or phenyl group, to form high molecular esters which, as component of their molecule, contain a phosphonic acid radical which is derived from a phosphonic acid ester of Formula III.

The term "lower" when used in this specification and in the appended claims in connection with an aliphatic radical means that such radical contains not more than 4 carbon atoms, unless expressly stated otherwise.

This phosphonic acid radical built into the polyesters corresponds to the formula

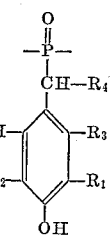

(IIIa)

wherein R₁, R₂, R₃ and R₄ have the meanings given in Formula III. The polyester macromolecule contains on the average about 0.0005 to 4% by weight preferably 0.005 to 1% by weight of phosphonic acid radical calculated on the total molecular weight of the polymer.

That the phosphonic acid radical of Formula III is actually a component of the macromolecule, i.e. that the high polymeric esters according to the invention are copolymers from the compounds of Formulas I, II and III, can be seen from the fact that, on extracting the polyesters according to the invention with solvents in which the phosphonic acid esters of Formula III are soluble, only inconsiderable amounts of this starting material can be removed from the polyester. What can be extracted corresponds in amount to about the content of technical polyester condensates of low molecular esters which can be extracted, thus it is only a slight fraction of the whole phosphonic acid ester. This shows that the phosphonic acid radicals in the polymer molecule are built in an ester-like manner into the polyesters according to the invention, either as chain members of the formula

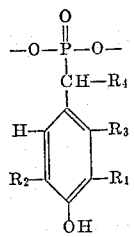
(IIIb)

and/or as end members of the formula

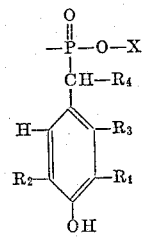
(IIIc)

in which formulas $R_1$, $R_2$, $R_3$ and $R_4$ have the meanings given in Formula III, and $X'$ in Formula IIIc has the meaning of $X_1$ or $X_2$ in Formula III.

It is known that polyesters are mixtures of compounds having varying molecular weight. They can be symbolized by the following formula:

E ... —O—A—O—CO—B—CO—O
—A—O—CO—B—CO—O—A—O—CO
—B—CO—O—A—O—CO—B—CO— ... E wherein A and B have the meanings given in Formula I or II respectively and wherein E, linked to a member of the formula —O—A—O— is hydrogen and, linked to a member —CO—B—CO—, is the hydroxyl group.

In the polymers according to the invention, some of the structural elements of the formula

—O—CO—B—CO—O— are replaced by the chain member of Formula IIIb. Instead of hydrogen as end member E, there can also be an end member of Formula IIIc.

In Formula I, A preferably represents a lower alkylene radical of from 1 to 8 carbon atoms which can also contain cycloaliphatic groups, e.g. the 1,2-ethylene,1,3-propylene, 1,4-butylene, 1,5-pentylene or 1,6-hexylene radical or a radical of the formula

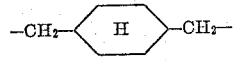

Preferably A is the 1,2-ethylene radical or the radical

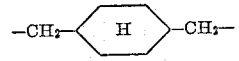

B, in Formula II, represents a mono- or polynuclear radical of the benzene series; in the former case, e.g., the 1,3- or 1,4-phenylene radical, in the latter case, a radical of the formula

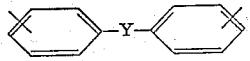

to which the —COOR and —COOR' groups are preferably bound in p- and p'-postion to Y and in which Y is the direct bond or a divalent bridging member, for example, alkylene of from 1 to 4 carbon atoms, or Y is —O—, —S—, —SO— or —SO$_2$—. B can also be a radical of the formula

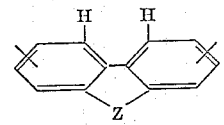

wherein Z is a member selected from the group consisting of —O— and —SO$_2$—;

In those cases in which, in Formula III, each of $X_1$ and $X_2$ is an aliphatic radical, it is an alkyl group having 1 to 10, preferably 1 to 4 carbon atoms, e.g. the methyl, ethyl, a propyl or a butyl group, or an ω-hydroxylalkyl group of the formula —A—OH, or ω-halogenoalkyl group having 2 to 4 carbon atoms, e.g., the β-hydroxyethyl or β-chloroethyl group.

If $R_1$ and $R_2$ are alkyl radicals, then they preferably contain 1 to 8 carbon atoms; they are thus, e.g. the methyl, ethyl, propyl, isopropyl, n-, sec. or tert. butyl or an amyl radical. As defined, at least one of $R_1$ and $R_2$ must be a secondary or, preferably, a tertiary alkyl or cycloalkyl group branched in the α-position such as the tert. butyl or tert. amyl group or the 1-methylcyclohexyl-(1) group.

For reasons of production, those compounds of Formula III are preferred in which R is hydrogen.

Divalent alcohols such as, preferably, α,ω-alkane-diols the alkylene radical of which can also include cyclo-aliphatic, particularly cycloalkyl, groups, and which preferably contain 2 to 8 carbon atoms are used as starting materials of Formula I, for example, 1,2-ethane-diol, 1,3-propane-diol, 1,4-butane-diol, 1,5-pentane-diol, 1,6-hexane-diol on 1,4-bis-hydroxymethyl-cyclohexane.

Preferred alcohols of this type are 1,2-ethane diol and 1,4-bis-hydroxymethyl-cyclohexane.

Examples of dicarboxylic acids or diesters of Formula II usable according to the invention are benzene-1,3- and -1,4-dicarboxylic acid, dimethyldiphenylmethane-4,4'-dicarboxylic acid, diphenyl ether-4,4'-dicarboxylic acid, diphenylthioether-4,4'-dicarboxylic acid, diphenylsulfone-4,4'-dicarboxylic acid as as well as, preferably, the esters of the acids mentioned with low alkanols having 1 to 5 carbon atoms. Naturally, also mixtures of the divalent alcohols and/or dicarboxylic acids or their esters of Formula I or II can be used according to the invention. In particular the use of benzene-1,3-dicarboxylic acid or benzene-1,3-dicarboxylic acid lower alkyl ester in mixtures with benzene-1,4-dicarboxylic acid or 1,4-dicarboxylic acid lower alkyl ester is recommended.

Some of the phosphonic acid esters of Formula III are known; they can be produced by methods known per se, for example, by reaction of the correspondingly substituted α-chloro- or α-bromo- α-phenylalkane with the desired trialkyl phosphite according to Arbusow. Examples of phosphonic acid esters of Formula III are: 4-hydroxy-3,5-di-tert. butylbenzyl phosphonic acid-dimethyl, -diethyl, or -dibutyl ester, 4-hydroxy-3-methyl-5- tert. butylbenzyl phosphonic acid-dimethyl, -diethyl or -dibutyl ester, 4-hydroxy-3-cyclohexyl-5-tert. butylbenzyl phosphonic acid-dimethyl, -diethyl or -dibutyl ester, 4-hydroxy-2-methyl-5-tert. butylbenzyl phosphonic acid diethyl ester, 4-hydroxy-3,5-di-tert. amylbenzyl phosphonic acid dimethyl ester, 4-hydroxy-3,5-di(1'-methyl-1'-cyclohexyl)-benzyl phosphonic acid dimethyl ester or 1-(4-hydroxy-3,5-di-tert. butylphenyl)-ethyl phosphonic acid dimethyl ester.

The phosphonic acid esters mentioned are distinguished by easy accessibility and their suitability for the polycondensation reaction.

Also, phosphonic acid esters of higher alcohols, i.e. those having 5 to 10 carbon atoms, can be used, for example 4-hydroxy-3,5-di-tert- butylbenzyl phosphonic acid dodecyl ester. However, more work is required to produce such esters in so great a degree of purity as is necessary for the use of the phosphonic acid esters according to the invention.

The reaction of the reaction components I, II and III to form high molecular esters is performed by the methods conventional in polyester synthesis, by heating the components at about 180 to 350° C. and preferably, at least in the final stage of the reaction to 270 to 310° C. while removing monovalent alcohols or the water formed. The relative amounts of the reaction components and the reaction conditions are so chosen that the end products contain 0.0005 to 4 mols percent of phosphonic acid radical of Formula IIIa, 49.8 to 50 mol-percent of structural element of formula —O—A—O— and the remainder consists of structural elements of the formula —CO—B—CO—, A and B having the meanings given in Formula I or II respectively.

In a preferred method of performing this process however, the dicarboxylic acids or their esters of Formula II are reacted in a first step with the divalent alcohols of Formula I in a molar ratio of 1:2 to 1:3, so that mainly the diesters of the dicarboxylic acids with the divalent alcohols of the formula

HO—A—OOC—B—COO—A—OH     (IV)

are formed in which A and B have the meanings given in Formulas I or II, respectively. In this reaction the two reaction partners are used in anhydrous state and it is performed at temperatures of about 180–220° C. with or without the presence of catalysts such as antimony oxide, lead oxide, tetraalkyl titanates etc. Then, in a second step, the diesters of Formula IV are condensed with the phosphonic acid esters of Formula III to form the polyesters according to the invention. For this purpose the temperature is slowly raised to 270–310° C. and the excess alcohols as well as those formed during the polycondensation, are distilled off in vacuo. The amount of alcohol to be removed depends on the degree of polymerisation desired. Advantageously the divalent alcohol is distilled off until a polymer is obtained from the reaction mixture, the 0.5% solution of which in a mixture of 40 parts of 1,1,2,2-tetrachloroethane and 60 parts of phenol shows an inherent viscosity of 0.3 to 1.0 at 30° C.

In a modification of the process according to the invention for the production of oxidation-resistant, color-stable, linear polyesters useful for forming fibers, it is also possible to use the pure diesters of Formula IV isolated in substance. This modification of the process consists in reacting these di-esters with phosphonic acid esters of Formula III to form high molecular esters which contain a phosphonic acid radical derived from the phosphonic acid ester of Formula III as component of their molecule.

In the preferred method of the first process, the diesters of Formula IV are obtained as a result of the first reaction step and, for example, can be isolated from the reaction mixture and then purified. They can also be obtained, however, by other methods. Thus, for example, preferred compounds of Formula IV in which A is the 1,2-ethylene radical, are obtained by adding 2 equivalents of ethylene oxide to 1 equivalent of dicarboxylic acid of Formula II. The molecular ratios of the two reaction components for this purpose are advantageously 50:0.01 to 5:1.

The reaction of the components of Formulas III and IV corresponds to the reaction which takes place in the second step of the preferred method of the first process.

Because of the fact that the component of Formula IIIa is built into the molecule during the condensation, the new polyesters, to which delustering agents such as titanium dioxide and brightening agents or pigments may be added, have greatly increased resistance to oxidation and, thus, increased length of life in comparison with high molecular polyesters not having this component in their molecules. Compared with such polyesters which are stabilised to oxidation by the addition of the usual antioxidants, the polymers according to the invention are distinguished both by their color stability which in general is considerably less influenced by light and oxygen, as well as by their resistance to oxidation which is not affected even after repeated washing with aqueous solutions of capillary active and wash-active substances or after treatment with organic solvents such as occurs in dry cleaning.

The polyesters produced according to the invention have a molecular weight in the range of about 5000 to about 40000.

Preferred solid, oxidation-resistant, color-stable, linear fiber-forming polyesters according to the invention are the polymeric reaction products of (a) a compound of the formula

HO—A—OH wherein A is an α,ω-divalent saturated aliphatic hydrocarbon radical of from 2 to 8 carbon atoms free from alkyl sidechains and comprising from 0 to 1 cyclohexyl rings, (b) a dicarboxylic acid derivative which is one of the compounds of the formulas

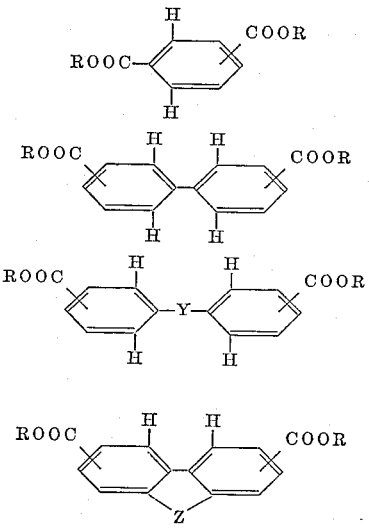

and wherein R represents hydrogen, lower alkyl or the radical —A—OH wherein A has the above-given meanings, Y represents alkylene of from 1 to 4 carbon atoms, —O—, —S—, —SO— or —SO₂—, and Z represents —O— and —SO₂—; and (c) a phosphonic acid ester of the formula

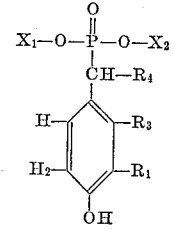

wherein

Each of $X_1$ and $X_2$ represents alkyl of from 1 to 10 carbon atoms, cyclohexyl, a radical of the formula —A—OH or a radical of the formula —A—Cl, wherein A has the above meaning, Each of $R_1$ and $R_2$ represents hydrogen, alkyl of from 1 to 8 carbon atoms, cyclohexyl or 1-methylcyclohexy-(1), at least one of $R_1$ and $R_2$ containing a secondary to tertiary carbon atom by means of which it is linked to the benzene nucleus in the last-given formula, $R_3$ represents hydrogen or methyl, and $R_4$ represents hydrogen, methyl, ethyl or phenyl;

the amounts of (a) and (b) entering into said polyester being essentially equimolar and the amount (c) entered into said polyester as chemically bonded units, being 0.0005 to 4% by weight calculated on the total molecular weight of the polymer which latter weight is in the range of from about 5,000 to about 40,000.

The invention is further illustrated by the following non-limitative examples in which the temperatures are given in degrees centrigrade.

Example 1

388 grams (g.) dimethyl-terephthalate, 300 g. of ethylene glycol and 0.4 g. of antimony oxide, are charged into a refined steel autoclave fitted with a stirrer, a gas inlet tube, vacuum facilities, a sloping condenser, a die such as a spinneret or the like extruding device in the floor which can be closed, a closable feeding device and a heating jacket are heated to 200° (exterior temperature) while blowing through pure nitrogen and this temperature is maintained for 3 hours. Methanol is slowly distilled off. Then, while excluding air, 0.80 g. of 4-hydroxy-3,5-di-tert.-butyl-benzyl phosphonic acid diethyl ester dissolved in 20 g. of ethylene glycol is carefully added through the inlet tube into the autoclave after the temperature has been allowed to drop to 190°. On completion of the addition, the temperature is raised within 1 hour to 285° exterior temperature whereupon 1,2-ethane diol is distilled off. As soon as the formation of distillate has ceased for all practical purposes, the autoclave is put under vacuum, the pressure is slowly reduced to 0.2 mm. Hg and the condensation is continued under these conditions for 3 hours when it is completed. All these operations are performed while stirring well. The liquid condensation polymer is then pressed by nitrogen through the die in the floor of the autoclave. Rods, bands or monofilaments can thus be produced from the liquid polymer. Compared with monofilaments made from the conventional poly(ethylene glycol-terephthalate), polyester monofilaments produced in the foregoing manner according to the invention have a greatly increased length of life.

Similar polymers having a somewhat lower softening point are obtained if, in the above example, instead of the 388 g. of dimethyl terephthalate, a mixture of 370 g. of dimethyl terephthalate and 18 g. of benzene-1,3-dicarboxylic acid dimethyl ester is used, or by replacing the dimethyl terephthalate in the above example by an equimolar amount of dipropyl-diphenyl-sulfone-4,4'-dicarboxylate and simultaneously replacing the 300 g. of ethylene glycol by an equimolar amount of 1,8-octane diol.

Example 2

194 g. of dimethyl terephthalate, 320 g. of 1,4-bis-hydroxymethyl cyclohexane and 0.3 g. of tetra-isopropyl titanate are heated in an autoclave as described in Example 1 to 200° C. under an atmosphere of nitrogen. The methanol formed is distilled off. The temperature is raised within 4 hours to 220°. Then, 5.4 g. of 4-hydroxy-3,5-di-tert. butyl-benzyl-phosphonic acid dihexyl ester dissolved in 50 g. of 1,4-bis-hydroxymethyl cyclohexane are added to the reaction mixture after which the temperature is slowly raised to 285°. At the same time the autoclave is put under slight vacuum which is increased according to the rate at which the alcohols are distilled off until finally it reaches 0.2 mm. Hg. The reaction mixture is condensed for 3 hours under these conditions. The temperature is then raised to 305° and the polymer is pressed out of the die in the floor of the autoclave by nitrogen as quickly as possible in the form of a band.

Monofilaments are produced from this polymer by extrusion; their length of life is excellent. Similarly stable polymers are obtained on using 4-hydroxy-3-methyl-5-tert. butylbenzyl phosphonic acid dimethyl ester or 4-hydroxy-3-cyclohexyl-5-tert. butylbenzyl phosphonic acid diethyl ester instead of the phosphoric acid ester used above.

Examples 3–14

Similar polymers are obtained by replacing in Example 1, one or several of the reactants (a) dimethylterephthalate, (b) ethylene glycol, and (c) the phosphonic acid ester used therein, by equimolar amounts respectively of compounds given in the table below, distilling off the respective alcohol being formed such as methanol in Example 1.

| Ex. | (a) | (b) | (c) |
|---|---|---|---|
| 3 | Dimethyl terephthalate | Ethylene glycol | 4-hydroxy-2-methyl-5-(1',1',3',3'-tetra-methyl-butyl)-benzyl-phosphonic acid di-n-decyl ester. |
| 4 | do | do | Phenyl-[4-hydroxy-2-methyl-5-tert. butyl-phenyl]-methyl phosphonic acid di-octyl ester ("octyl" being derived from a mixture of 1 mole of n-octyl alcohol and 1 mole of 2-ethyl-hexyl alcohol.) |
| 5 | diethyl diphenyloxide 4,4'-dicarboxylate | 1,3-propane-diol | α-[4-hydroxy-3-methyl-5-(1'-methylcyclohexyl)-phenyl]-ethyl-phosphonic acid di-isopropyl ester. |
| 6 | Diethyl diphenylsulfoxide-4,4'-dicarboxylate | 1,5-pentane-diol | 4-hydroxy-3,5-di-tert-pentyl-benzylphosphonic acid bis-(β-hydroxy-ethyl)ester. |
| 7 | diethyl diphenylsulfone-4,4'-dicarboxylate | do | 4-hydroxy-3,5-di-tert.butyl-benzylphosphonic acid β-chloroethyl methyl ester. |
| 8 | diethyl-diphenyl-methane-4,4'-dicarboxylate | 1,4-butane-diol | 4-hydroxy-3,5-di-tert-butyl-benzylphosphonic acid bis-s[hydroxy-butyl] ester. |
| 9 | Diethyl diphenyl-4,4'-dicarboxylate | 1,6-hexane-diol | 4-hydroxy-3,5-diisopropyl-benzyl phosphonic acid dimethyl ester. |
| 10 | dimethyl diphenyloxide-4,4'-dicarboxylate | 1,4-butane-diol | 4-hydroxy-3,5-di-amyl-benzyl phosphonic acid di-methyl ester. |
| 11 | Bis-(β-hydroxyethyl)-diphenylsulfide-4,4'-dicarboxylate | do | 4-hydroxy-3,5-di-tert butyl-benzyl phosphonic acid dimethyl ester. |
| 12 | HO(CO₂)₈OOC—⟨diphenylsulfone⟩—COO(CH₂)₈OH | 1,8-octane-diol | 4-hydroxy-2,3-dimethyl-5-t-butyl-benzyl-phosphonic acid di-propyl ester. |
| 13 | HO–(CH₂)₅–O–CO—⟨dibenzofuran⟩—CO–O–(CH₂)₅–OH | 1,5-pentane-diol | 4-hydroxy-3,5-di-isopropyl-benzyl phosphonic acid di-isopropyl ester. |
| 14 | Mixture of dibutyl diphenylsulfone-4,4'-dicarboxylate and dibutyl diphenylsulfone-3,3'-dicarboxylate (molar ratio 4:1). | Ethylene glycol | 4-hydroxy-2-methyl-5-amyl-benzylphosphonic acid diethyl ester. |

PART II

According to a second aspect, the present invention concerns new linear, fiber-forming polyamides, which polyamides have improved resistance to oxidation and color stability, as well as processes for the production thereof.

It has been found that these new polyamides are obtained by reacting compounds of the formula

$$H_2N—A'—NH_2 \qquad (I)$$

wherein

A′ represents an α,ω-alkylene radical having 4 to 6 carbon atoms or an ω,ω′-m-xylylene radical are reacted, at a raised temperature, with dicarboxylic acids of the formula $$HOOC—B'—COOH \qquad (II)$$

wherein

B′ represents an α,ω-alkylene radical having 2 to 10 carbon atoms, and with phosphonic acid esters of the formula

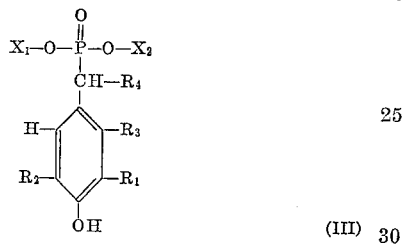

(III)

wherein $X_1$ and $X_2$, independently of each other, represent an alkyl group having 1 to 10 carbon atoms, a hydroxyalkyl or halogenalkyl radical having 2 to 4 carbon atoms or the cyclohexyl radical, $R_1$ and $R_2$, independently of each other, represent hydrogen, an alkyl, cyclohexyl or 1-methylcyclohexyl-(1) group whereby at least one of $R_1$ and $R_2$ is a secondary or tertiary alkyl or cycloalkyl group, $R_3$ represents hydrogen or the methyl group, and $R_4$ represents hydrogen, the methyl, ethyl or phenyl group, to form high-molecular amides which, as component of their molecule, contain a phosphonic acid radical which is derived from the phosphonic acid ester of Formula III.

The phosphonic acid radical built into the polyamide corresponds to the formula

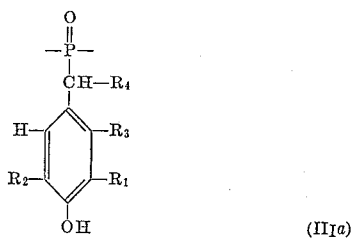

(IIIa)

In this formula, $R_1$, $R_2$, $R_3$ and $R_4$ have the meanings given in Formula III. The proportion by weight of the radical IIIa in the polyamide macromolecule is, on the average, about 0.001 to 5% by weight preferably 0.01 to 1% calculated on the total weight of the polymer.

That the phosphonic acid radical of Formula III is actually a component of the macromolecule, i.e. that the high polymeric amides according to the invention are copolymers of the compounds of Formulas I, II and III, can be seen from the one fact, among others, that on extracting the polyamides according to the invention with solvents in which the phosphonic acid esters of Formula III are soluble, only inconsiderable amounts of this starting material can be removed. This slight amount corresponds roughly to the amount of caprolactam which can be extracted from technical polycaprolactam which, after the polymerization and before the final working up of the polymer, must be removed therefrom by washing with water. From this it can be seen that the phosphonic acid radicals are built into the polyamide molecules in an amide-like manner, i.e. as chain members of the formula

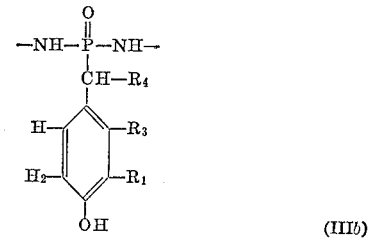

(IIIb)

and/or as end members of the formula

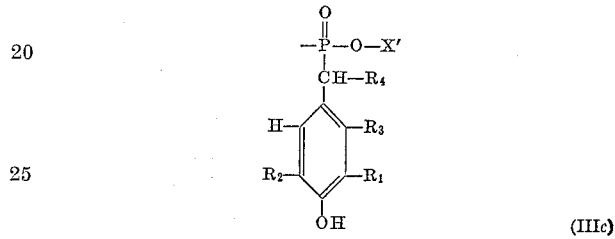

(IIIc)

in which formulae $R_1$, $R_2$, $R_3$ and $R_4$ have the meanings given in Formula III, and X′ in Formula IIIc has the meaning of $X_1$ or $X_2$ in Formula III.

The α,ω-alkylene radical symbolized by A′ in Formula I contains 4 to 6 carbon atoms, the α,ω- alkylene radical B′ in Formula III has 2 to 10, preferably 4 to 8 carbon atoms.

If $X_1$ and $X_2$ in Formula III each represent an aliphatic radical, then, as alkyl group, they have 1 to 10, preferably 1 to 4 carbon atoms; they can be, for example, the methyl, ethyl, a propyl or a butyl group, but also, e.g. an octayl, isooctyl or decyl group. As hydroxyalkyl or halogenalkyl groups, $X_1$ and $X_2$ have 2 to 4 carbon atoms; they are then, for example, the β-hydroxyethyl or the β-chloroethyl group.

As alkyl radicals, each of $R_1$ and $R_2$ is preferably one having 1 to 8 carbons, for example, the methyl, ethyl, propyl, isopropyl, n-, sec.- or tert.-butyl radical or an amyl radical. As defined, at least one of $R_1$ and $R_2$ must be secondary or, preferably, a tertiary alkyl or cycloalkyl group branched in the α-position such as the tert. butyl or tert. amyl group or the 1-methyl-cyclohexyl-(1) group.

For production reasons, those compounds of Formula III are preferred in which $R_4$ represents hydrogen.

Examples of starting materials of Formula I which can be used according to the invention are 1,2-diaminoethane, 1,3-diaminopropane, 1,4-diamino-butane, 1,5-diaminopentane or 1,6-diaminohexane as well as 1,3-bis-(aminomethyl)-benzene. Preferred di-amines of this type are 1,4-diaminobutane and 1,6-diaminohexane.

Examples of dicarboxylic acids of Formula II which can be used according to the invention are the ethane-1,2-, propane-1,3-. butane-1,4-, pentane-1,5-, hexane-1,6-, heptane-1,7-, octane-1,8- or decane-1,10- dicarboxylic acids. Preferred compounds of Formula II are butane-1,4-dicarboxylic acid (adipic acid) and octane-1,8-dicarboxylic acid (sebacic acid).

Naturally, also mixtures of the diamino compounds and/or of the dicarboxylic acids of Formula I or II respectively can be used according to the invention.

Some of the phosphonic acid esters of Formula III are known. All can be produced by methods known per se, for example by reacting correspondingly substituted α-chloro- or α-bromo- α-phenyl-alkane with the desired trialkyl phosphite according to Arbusow.

Examples of phosphonic acid esters of Formula III are: 4-hydroxy-3,5-di-tert. butylbenzyl phosphonic acid-dimethyl, -diethyl or -dibutyl ester, 4-hydroxy-3-methyl-5-tert. butylbenzyl phosphonic acid-dimethyl, -diethyl or -dibutyl ester, 4-hydroxy-3-cyclohexyl-5-tert. butylbenzyl phosphonic acid-dimethyl, -diethyl or -dibutyl ester, 4-phosphonic acid-dimethyl, -diethyl or -dibutyl ester, 4-hydroxy-2-methyl-5-tert. butylbenzyl phosphonic acid-diethyl ester, 4-hydroxy-3,5-di-tert. amylbenzyl phosphonic acid dimethyl ester, 4-hydroxy-3,5-di-(1'-methyl-1'-cyclohexyl)-benzyl phosphonic acid dimethyl ester or 1-(4'-hydroxy-3',5'-di - tert. butylphenyl) - ethyl - phosphonic acid dimethyl ester.

The esters mentioned are distinguished by easy accessibility and suitable behaviour in the polycondensation.

In addition, also phosphonic acid esters of higher alcohols, i.e. those having 5 to 10 carbon atoms, can be used, for example, 4-hydroxy-3,5-di-tert. butylbenzyl phosphonic acid dodecyl ester. However, the production of such esters with such a high degree of purity as is necessary for the use of phosphonic acid esters according to the invention necessitates much more work.

The reaction of the starting materials to form the high molecular amides according to the invention is performed, for example, by heating the components under the conditions usual in polyamide synthesis, i.e. at 200 to 300° C., particularly at 250°–290° C. For this reaction the diamines and dicarboxylic acids are preferably used in the form of the 1:1 salts, e.g. as "A'H-salt" or "6,6-salt," i.e. as salt of 1 equivalent each of 1,6-diaminohexane and butane-1,4-dicarboxylic acid (adipic acid). As comonomers, the phosphonic acid esters of Formula III are added to these diamine-dicarboxylic acid salts in amounts of 0.001 to 5% by weight, preferably 0.01 to 1% by weight calculated on the weight of the resulting mixture, and, to attain a high degree of polymerization, an amount of excess diamine corresponding to the amount of the phosphonic acid ester is also used.

In a modification of the process according to the invention, instead of the diamines and dicarboxylic acids of Formula I or II respectively, also their pre-condensates which consist of mixtures of compounds of Formula IV, E . . . —NH—A'—NH—CO—B'—CO—NH—A'
—NH—CO—B'—CO—NH—A'
—NH—CO—B'—CO— . . . E    (IV)

can be reacted with the phosphonic acid esters of Formula III to form the amides according to the invention.

In Formula IV, A' and B' have the meanings given in Formula I or II respectively and the end member E is hydrogen or the hydroxyl group depending on whether it is bound to the structural unit of the formula

—NH—A'—NH— or —CO—B'—CO— respectively.

The compounds of Formula IV are obtained by polycondensation of the diamines and dicarboxylic acids of Formula I and II by the methods usual in the synthesis of simple polyamides.

The reaction to form the high molecular amides according to the invention is performed by heating the starting materials at 210–300° C., preferably at a temperature over the softening point of the starting materials of Formula IV. The phosphonic acid ester of Formula III is built into the macromolecule with simultaneous transamidation of the polyamide chain of compounds of Formula IV, i.e. a new equilibrium is formed in the chain members.

The structure of the polymer obtained according to the invention is analogous to that of Formula IV with the difference that some of the structural elements of formula —NH—CO—B'—CO—NH— are replaced by phosphonic acid radicals of Formula IIIb and some of the end members E, when E is hydrogen, are replaced by end members of Formula IIIc.

Preferred polyamides according to this second aspect of the invention are those which are reaction products of (a) a compound of the formula

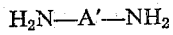

wherein

A' represents α,ω-alkylene of 4 to 6 carbon atoms or ω,ω'-m-xylylene, with (b) a dicarboxylic acid of the formula

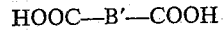

wherein

B' is a α,ω-alkylene of from 2 to 10 carbon atoms, and a phosphonic acid ester of the formula

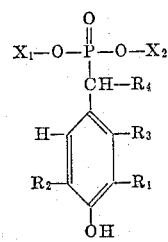

(IIIA)

wherein

Each of $X_1$ and $X_2$ represents alkyl of from 1 to 10 carbon atoms, ω-hydroxyalkyl of from 2 to 4 carbon atoms, ω-halogenalkyl of from 2 to 4 carbon atoms wherein halogen has an atomic number of from 17 to 35, or cyclohexyl, Each of $R_1$ and $R_2$ represents hydrogen, alkyl of from 1 to 8 carbon atoms, 1-methylcyclohexyl-(1), at least one of $R_1$ and $R_2$ containing a secondary to tertiary carbon atom by means of which it is linked to the benzene nucleus in the last-given formula.

$R_3$ represents hydrogen or methyl, and $R_4$ represents hydrogen, methyl, ethyl or phenyl, the amounts of (a) and (b) entering into said polyamide being essentially equimolar and the amount (c) entered into said polyester as chemically bonded units, being 0.005 to 4% by weight, calculated on the total weight of the polymer, which latter weight is in the range of from about 5,000 to about 40,000.

The phosphonic acid esters of Formula III and especially of Formula IIIA are used in amounts of 0.001 to 5%, preferably 0.01 to 1%, calculated on the total weight of the end polymer. When, instead of the ω-amino-carboxylic acids or their lactams, their polymers are used, the reaction mixture is heated to 210–300°, if necessary while adding an amount of diamine of Formula I corresponding to the amount of the phosphonic acid ester. In this case too, as in the previous process, a new equilibrium is formed in the chain members with simultaneous transamidation.

The new polyamides, to which delustering agents such as titaniumdioxide, brightening agents or pigments may be added, are given greatly increased resistance to oxidation and thus increased length of life by the components of the molecule of Formula IIIa which have been built in during the condensation, compared with high molecular polyamides not having these components in the molecule. Compared with such polyamides which are stablized to oxidation by the usual antioxidants the polymers according to the invention are distinguished both by their color stability, which in general is considerably less influenced by light and oxygen, as well as by their resistance to oxidation which, even after repeated washing with aqueous solutions of capillary active and wash-active substances or after treatment with organic solvents such as occurs in dry cleaning, it not affected.

A further modification of the process according to the invention consists in reacting ω-aminocarboxylic acids of Formula V $$HOOC—D—NH_2 \qquad (V)$$

or their lactams or polymers with phosphonic acid esters of Formula III, and preferably IIIA. In Formula V, D represents a linear α,ω-alkylene radical; this advantageously contains 5 to 11, in particular 5, 10 or 11, carbon atoms.

Preferred starting materials of Formula V are caprolactam and ω-amino-undecylic acid as well as the polymers of the compounds mentioned.

The reaction of the ω-aminocarboxylic acids or their lactams with the phosphonic acid esters is performed under the conditions usual in the production of the simple polyamides from ω-aminocarboxylic acids or the lactams thereof, i.e. by heating the components, optionally in the presence of water, to 210–300° C. It should be noted that the phosphonic acid esters of Formula III behave in this reaction like the dicarboxylic acids corresponding to Formula II, therefore to attain a high degree of polymerization, the former must be compensated with corresponding amounts of diamine of Formula I.

The new polyamides according to the second and third aspects of the innvention, are not only useful as fiber-forming polymers as are the polyesters according to the first-described aspect thereof, but they are also suited for the production of molded articles, especially by injection molding.

For this latter application, polymers prepared from caprolactam and the benzylphosphonates of Formula III are particularly suited.

When used in textile fabrics and the like, the new polyamides are distinguished from the polyester fibers by being generally less stiff, but slightly less stable to oxidation.

The second and third aspect of the invention is further illustrated by the following non-limitative examples in which the temperatures are given in degrees centigrade.

Example 1

300 grams (g.) of the salt of 1 equivalent each of 1,6-diamino-hexane and adipic acid (hexamethylenediammonium adipate, also known as "AH salt" or "6,6 salt") are mixed with 300 g. of distilled water at 80°. 1.5 g. of 4-hydroxy-3,5-di-(tert.butyl)-benzene phosphonic acid diethyl ester are added to this mixture, and the mixture is heated to 270–280° within 1 hour in a refined steel autoclave while carefully excluding oxygen. During this heating period the pressure in the autoclave is maintained at 30 atmospheres excess pressure by release of steam. The temperature is then raised to 285° and the pressure is reduced within 30 minutes to atmospheric pressure. The polycondensation which is thus commenced is completed by heating at 280° for about 4 hours. The polymer, in the form of a viscous melt, is then expressed by nitrogen through a die in the floor of the autoclave.

Monofilaments are spun from the polymer so obtained which, compared with monofilaments produced without the addition of the phosphonic acid ester mentioned, have a considerably increased length of life.

If, instead of the "AH salt" mentioned, the salt from 1 equivalent each of 1,6-diaminohexane and sebacic acid (hexamethylenediammonium sebacate, also known as "6, 10 salt") is used and otherwise the procedure described above is followed, then a polymer having a somewhat lower melting point is obtained which, compared with "normal" 6,10 nylon, has an increased length of life.

If, instead of the phosphonic acid ester described in the example, 4-hydroxy-3-cyclohexyl-5-tert. butylbenzylphosphonic acid diethyl ester is used and otherwise the procedure described above is followed, then polymers with similarly good properties are obtained.

Examples 2–13

Similar polymers are obtained by replacing in Example 1, one or several of the reactants
(a) 1-6-diamino hexane
(b) Adipic acid, and
(c) The phosphonic acid esters used therein, by equimolar amounts, respectively, of components given in the table below.

| Ex. | (a) | (b) | (c) |
| --- | --- | --- | --- |
| 2 | 1,4-diaminobutane | Adipic acid | 4-hydroxy-2-methyl-5-(1',1',3',3'-tetramethyl-butyl)-benzyl-phosphonic acid di-n-decyl ester. |
| 3 | 1,6-diaminohexane | do | Phenyl-[4-hydroxy-2-methyl-5-tert. butyl-phenyl]-methyl phosphonic acid di-octyl ester ("octyl" being derived from a mixture of 1 mole of n-octyl alcohol and 1 mole of 2-ethyl-hexyl alcohol). |
| 4 | do | Sebacic acid | α-[4-hydroxy-3-methyl-5-(1'-methylcyclohexyl)-phenyl]-ethyl-phosphonic acid di-isopropyl ester. |
| 5 | do | Succinic acid | 4-hydroxy-3,5-di-tert-pentyl-benzylphosphonic acid bis-(β-hydroxy-ethyl) ester. |
| 6 | 1,4-diaminobutane | Decane-1,10-dicarboxylic acid. | 4-hydroxy-3,5-di-tert-butyl-benzylphosphonic acid β-chloroethyl methyl ester. |
| 7 | 1,6-diaminohexane | Sebacic acid | 4-hydroxy-3,5-di-tert-butyl-benzylphosphonic acid bis-(δ-hydroxy-butyl)ester. |
| 8 | do | do | 4-hydroxy-3,5-diisopropyl-benzyl phosphonic acid dimethyl ester. |
| 9 | do | do | 4-hydroxy-3,5-di-amyl-benzyl phosphonic acid di-methyl ester. |
| 10 | 1,4-diaminobutane | do | 4-hydroxy-3,5-di-tert butyl-benzyl phosphonic acid dimethyl ester. |
| 11 | 1,6-diaminohexane | Adipic acid | 4-hydroxy-2,3-dimethyl-5-t-butyl-benzyl-phosphonic acid di-propyl ester. |
| 12 | do | do | 4-hydroxy-3,5-di-isopropyl-benzyl phosphonic aicd di-isopropyl ester. |
| 13 | do | Suberic acid | 4-hydroxy-2-methyl-5-amyl-benzylphosphonic acid di-ethyl ester. |

Example 14

Polyamide chips (nylon 66) are dried so that the water content is less than 0.1% by weight and then thoroughly mixed in a mixing drum with 0.1% by weight, of the stabilizing agent, calculated on the weight of the polyamide chips used in Example 1 of Part II. This mixture is melted at a temperature of 285° while excluding oxygen and the melt is spun within one hour into monofilaments by expressing it through a valve. The monofilaments are then stretched on the stretching machine in a ratio of 3.8:1. By using, instead of the stabilizing agent used in Example 1, equivalent amounts of the stabilizing agent used in Example 1, equivalent amounts of the stabilizing agents used in Examples 3, 11 and 12, respectively similar monofilaments are obtained.

The results correspond in every way to those described in Examples 1, 3, 11 and 12.

Other polyamides such as e.g. polyhexamethylenediamine sebacate can be converted in the same manner to products which are stable to oxidation.

Example 15

Dried, commercial ε-polycaprolactam chippings (nylon 6) having less than 0.1% water content are thoroughly mixed in a mixing drum with 0.1% by weight, calculated on the weight of the chippings of 4-hydroxy-3,5-di-tert. butylbenzyl-phosphonic acid dihexyl ester. This mixture is melted at 265° while excluding oxygen and kept for 1 hour at this temperature. The polymer melt so obtained is expressed under pressure into bands which are then chipped. Monofilaments are spun from the copolymer so obtained which, compared with those for which polycaprolactam was used as starting material, have a considerably improved length of life.

Monofilaments having increased length of life are obtained in an analogous manner from poly(11-undecylic acid amide) chippings by condensing an equimolar amount thereof, in lieu of nylon 6, with the phosphonic acid ester described above.

Example 16

400 parts of caprolactam,
40 parts of water,
0.4 part of the phosphonic derivatives given in the table below are mixed and heated until the mass becomes liquid which is at about 70°.

The liquid mixture is put into an autoclave made of non-rusting material and heated, while excluding oxygen, to a temperature of about 250° within one hour. The gauge pressure rises to about 10 to 15 atmospheres.

At the end of the said time the water is distilled off and then pressure is released and the polymeric mass is kept at 250° until the gases formed have been completely eliminated.

By this time the mass has attained a viscosity which enables the polymer to be pressed out by means of nitrogen through a spinneret placed on the bottom of the autoclave.

The spinneret used has an inner diameter of 1 mm. and a length of 10 mm. The polymer is extruded through the spinneret by means of nitrogen of 15–20 atm. pressure and the thread which solidifies from the melt is drawn off at the rate of 150 meters per minute.. Between the spinneret and the spool onto which the thread is wound, a cooling bath (water of 20° C.) is fixed in order to completely cool the monofilament; it is directed through the bath by means of a guide roller. Monomers are removed from the monofilament, which is wound crosswise on a perforated spool, by extraction with 70° warm water. The filament is then stretched between two rollers, one of which is rotating four times faster than the other, care being taken to allow no slippage.

By using, instead of caprolactam, 11-aminoundecylic acid and otherwise following the same procedure, analogous results are obtained.

Examples 17–28

(17) 4-hydroxy-2-methyl-5-(1′,1′,3′-tetramethyl-butyl)-benzyl-phosphonic acid di-n-decyl ester

(18) Phenyl-[4-hydroxy-2-methyl-5-tert. butyl-phenyl]-methyl phosphonic acid di-octyl ester ("octyl" being derived from a mixture of 1 mole of n-octyl alcohol and 1 mole of 2-ethyl-hexyl alcohol)

(19) α-[4-hydroxy-3-methyl-5-(1′-methylcyclohexyl)-phenyl]-ethyl-phosphonic acid di-isopropyl ester

(20) 4-hydroxy-3,5-di-tert. - pentyl - benzylphosphonic acid bis-(β-hydroxy-ethyl) ester

(21) 4-hydroxy-3,5-di-tert.-butyl-benzylphosphonic acid β-chloroethyl methyl ester

(22) 4-hydroxy-3,5-di-tert.-butyl-benzylphosphonic acid bis-(σ-hydroxy-butyl) ester

(23) 4-hydroxy-3,5-diisopropyl-benzyl phosphonic acid dimethyl ester

(24) 4-hydroxy-3,5-di-amyl-benzyl phosphonic acid dimethyl ester

(25) 4-hydroxy-3,5-di-tert. butyl-benzyl phosphonic acid dimethyl ester

(26) 4 - hydroxy - 2,3 - dimethyl-5-t-butyl-benzyl-phosphonic acid di-propyl ester

(27) 4 - hydroxy-3,5-di-iso-propyl-benzyl phosphonic acid di-isopropyl ester

(28) 4 - hydroxy-2-methyl-5-amyl-benzyl phosphonic acid di-ethyl ester

We claim:
1. A solid, oxidation-resistant, color-stable, linear, fiber-forming polyester which is the polymeric reaction product of
(a) a compound of the formula

HO—A—OH wherein A is a α,ω-divalent saturated aliphatic hydrocarbon radical of from 2 to 8 carbon atoms free from alkyl sidechains and being interrupted by from 0 to 1 cyclohexyl ring,
(b) a dicarboxylic acid derivative selected from the group consisting of the compounds of the formulas

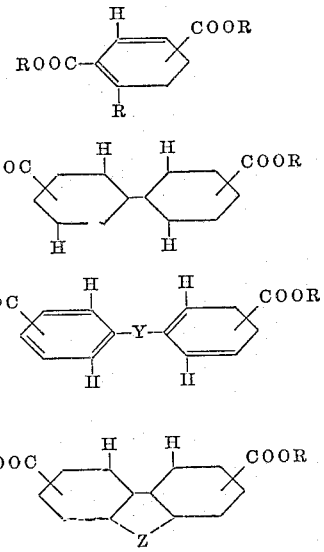

wherein R is a member selected from the group consisting of hydrogen, lower alkyl and the radical —A—OH, wherein A has the above-given meaning,
Y is a member selected from the group consisting of alkylene of from 1 to 4 carbon atoms, —O—, —S—, —SO— and —$SO_2$—, and
Z is a member selected from the group consisting of —O— and —$SO_2$—; and
(c) a phosphonic acid ester of the formula

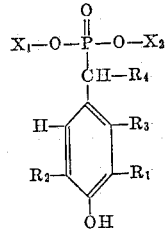

wherein each of $X_1$ and $X_2$ is a member selected from the group consisting of alkyl of from 1 to 10 carbon atoms, cyclohexyl, a radical of the formula —A—OH and a radical of the formula —A—Cl, wherein A has the above-given meaning,
each of $R_1$ and $R_2$ is a member selected from the group consisting of hydrogen alkyl of from 1 to 8 carbon atoms, cyclohexyl and 1-methylcyclohexyl-(1), at least one of $R_1$ and $R_2$ containing a secondary to tertiary carbon atom by means of which it is linked to the benzene nucleus in the last-given formula
$R_3$ is a member selected from the group consisting of hydrogen and methyl and

17

R₄ is a member selected from the group consisting of hydrogen, methyl, ethyl and phenyl;
the amounts of (a) and (b) entering into said polyester being essentially equimolar and the amount of (c) entering into said polyester as chemically bonded units, being 0.0005 to 4 mole percent calculated on the total molecular weight of the polymer which latter weight is in the range of from about 5000 to about 40000.

2. A solid, oxidation-resistant, color-stable, linear, fiber-forming polyester which is the polymeric reaction product of
   (a) ethane-1,2-diol
   (b) dimethyl terephthalate and
   (c) 4-hydroxy-3,5-di-(tert.butyl) - benzyl phosphonic acid diethyl ester,
the amounts of (a) and (b) entering into said polyester being essentially equimolar and the amount of (c) entering into said polyester as chemically bonded units, being 0.0005 to 4 mole-percent calculated on the total molecular weight of the polymer which latter weight is in the range of from about 5000 to about 40,000.

3. A solid, oxidation-resistant, color-stable, linear, fiber-forming polyester which is the polymeric reaction product of
   (a) 1,4-bis-hydroxymethyl-cyclohexane
   (b) diamethyl terephthalate
   (c) 4-hydroxy-3,5-di-(tert.butyl) - benzyl phosphonic acid ester,
the amounts of (a) and (b) entering into said polyester being essentially equimolar and the amount of (c) entering into said polyester as chemically bonded units, being 0.0005 to 4 mole-percent calculated on the total molecular weight of the polymer which latter weight is in the range of from about 5000 to about 40,000.

4. A solid, oxidation-resistant, color-stable, linear, fiber-forming polyamide which is the reaction product of
   (a) a compound of the formula

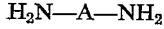

wherein A is a member selected from the group consisting of α,ω-alkylene of 4 to 6 carbon atoms and ω,ω'-m-xylylene
   (b) a dicarboxylic acid of the formula

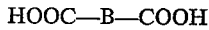

wherein B is a α,ω-alkylene of from 2 to 10 carbon atoms and (c) a phosphonic acid ester of the formula

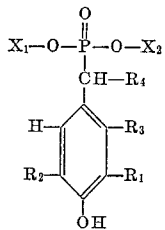

wherein each of X₁ and X₂ is a member selected from the group consisting of alkyl of from 1 to 10 carbon atoms, cyclohexyl, a radical of the formula —A—OH, and a radical of the formula —A—Cl, wherein A has the above-given meaning,
   each of R₁ and R₂ is a member selected from the group consisting of hydrogen, alkyl, of from 1 to 8 carbon atoms, cyclohexyl and 1-methylcyclohexyl-(1), at least one of R₁ and R₂ containing a secondary to tertiary carbon atom by means of which it is linked to the benzene nucleus in the last-given formula
   R₃ is a member selected from the group of hydrogen or methyl and
   R₄ is a member selected from the group consisting of hydrogen, methyl, ethyl and phenyl; the amounts of (a) and (b) entering into said polyamide being essentially equimolar and the amount of (c) entering

18 into said polyester as chemically bonded units, being 0.0005 to 4 mole-percent calculated on the total molecular weight of the polymer which latter weight is in the range of from about 5000 to about 40,000.

5. A solid oxidation-resistant, color-stable, linear fiber-forming polyamide which is the polymeric reaction product of
   (a) 1,6-diamino-hexane
   (b) adipic acid
   (c) 4-hydroxy-3,5-di-(tert.butyl) - benzene phosphonic acid diethyl ester,
the amounts of (a) and (b) entering into said polyamide being essentially equimolar and the amount of (c) entering into said polyamide as chemically bonded units, being 0.0005 to 4 mole-percent calculated on the total molecular weight of the polymer which latter weight is in the range of from about 5000 to about 40,000.

6. A solid oxidation-resistant, color-stable, linear, fiber-forming polyamide which is the polymeric reaction product of
   (a) 1,6-diamino-hexane
   (b) sebacic acid
   (c) 4-hydroxy-3-methyl-5-tert.methyl - benzyl - phosphonic acid dimethyl ester,
the amounts of (a) and (b) entering into said polyamide being essentially equimolar and the amount of (c) entering into said polyamide as chemically bonded units, being 0.0005 to 4 mole-percent calculated on the total molecular weight of the polymer which latter weight is in the range of from about 5000 to about 40,000.

7. A solid oxidation-resistant, color-stable, linear fiber-forming polyamide which is the polymeric reaction product of
   (a) 1,6-diamino-hexane
   (b) adipic acid
   (c) 4-hydroxy-3-cyclohexyl - 5 - tert.butylbenzyl-phosphonic acid diethyl ester,
the amounts of (a) and (b) entering into said polyamide being essentially equimolar and the amount of (c) entering into said polyamide as chemically bonded units, being 0.0005 to a 4 mole-percent calculated on the total molecular weight of the polymer which latter weight is in the range of from about 5000 to about 40,000.

8. A solid, oxidation-resistant, color-stable, linear, fiber-forming polyamide which is the reaction product of
   (a) a member selected from the group consisting of
      (i) an ω-aminocarboxylic acid of the formula HOOC—D—NH₂ wherein D represents a linear α,ω-alkylene radical containing from 5 to 11 carbon atoms,
      (ii) the lactam of said acid, and
      (iii) a polymer of said acid or said lactam, which polymer has a molecular weight of about 244 to about 40,000, with
   (b) phosponic acid ester of the formula

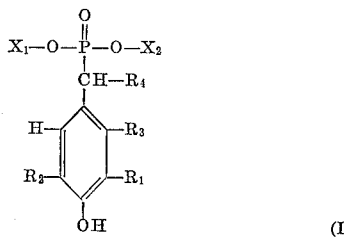

wherein X₁ and X₂ is a member selected from the group consisting of alkyl of from 1 to 10 carbon atoms, cyclihexyl, a radical of the formula —A—OH, and a radical of the formula —A—Cl, wherein A is a member selected from the group consisting of α,ω-alkylene of 4 to 6 carbon atoms and ω,ω'-m-xylylene,
   each of R₁ and R₂ is a member selected from the group consisting of hydrogen, alkyl, of from 1 to 8 carbon atoms, cyclohexyl and 1-methylcyclohexyl- (1), at least one of $R_1$ and $R_2$ containing a secondary to tertiary carbon atom by means of which it is linked to the benzene nucleus in Formula III $R_3$ is a member selected from the group of hydrogen or methyl and $R_4$ is a member selected from the group consisting of hydrogen, methyl, ethyl and phenyl;

the amount of (b) entering into said polyamide as chemically bonded units, being 0.0005 to 4 mole-percent calculated on the total molecular weight of the polymer which latter weight of the polyamide polymer which latter weight is in the range of from about 5000 to about 40,000.

9. A solid oxidation-resistant, color-stable, linear, fiber-forming polyamide which is the polymeric reaction product of
(a) ε-polycaprolactam, with
(b) 4-hydroxy-3,5-di-(tert.butyl) - benzyl - phosphonic acid dihexyl ester the amount of (b) entering into said polyamide as chemically bonded units, being 0.0005 to 4 mole-percent calculated on the total molecular weight of the polymer which latter weight is in the range of from about 5000 to about 40,000.

References Cited
UNITED STATES PATENTS

| | | | |
|---|---|---|---|
| 3,052,653 | 9/1962 | Iannicalli | 260—75 |
| 3,202,692 | 8/1965 | Well et al. | 260—75 |
| 3,224,973 | 12/1965 | Knapp | 260—45.95 |

FOREIGN PATENTS 1,122,252  1/1962  Germany.

WILLIAM H. SHORT, *Primary Examiner.*

LOUISE P. QUAST, *Examiner.*